(12) United States Patent
Song et al.

(10) Patent No.: US 9,796,589 B2
(45) Date of Patent: Oct. 24, 2017

(54) METHOD FOR MANUFACTURING LITHIUM METAL PHOSPHATE

(71) Applicant: SAMSUNG SDI CO., LTD., Yongin-si, Gyeonggi-do (KR)

(72) Inventors: Hyun A Song, Gyeonggi-do (KR); Dong Gyu Chang, Daejeon (KR); Jong Min Kim, Daejeon (KR); Jae Seung Shin, Gyeongsangbuk-do (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 14/767,405

(22) PCT Filed: Jun. 13, 2014

(86) PCT No.: PCT/KR2014/005222
§ 371 (c)(1),
(2) Date: Aug. 12, 2015

(87) PCT Pub. No.: WO2014/200311
PCT Pub. Date: Dec. 18, 2014

(65) Prior Publication Data
US 2016/0002040 A1 Jan. 7, 2016

(30) Foreign Application Priority Data

Jun. 14, 2013 (KR) .................... 10-2013-0068580

(51) Int. Cl.
*C01B 25/45* (2006.01)
*H01M 4/58* (2010.01)
(Continued)

(52) U.S. Cl.
CPC .......... *C01B 25/45* (2013.01); *H01M 4/5825* (2013.01); *C01P 2006/40* (2013.01);
(Continued)

(58) Field of Classification Search
CPC ... C01B 25/45; H01M 4/5825; H01M 4/0471; H01M 4/366; H01M 4/587; H01M 4/625; H01M 10/0525; C01P 2006/40
(Continued)

(56) References Cited

U.S. PATENT DOCUMENTS

2007/0212606 A1    9/2007  Chang
2009/0186277 A1*   7/2009  Beck .................... H01M 4/5825
                                                                 429/221
(Continued)

FOREIGN PATENT DOCUMENTS

CN          101508431 A  *  8/2009
CN          102612487 A     7/2012
(Continued)

OTHER PUBLICATIONS

International Search Report issued in corresponding application No. PCT/KR2014/005222 mailed Oct. 10, 2014 (2 pages).
(Continued)

*Primary Examiner* — Harold Pyon
*Assistant Examiner* — Danny N Kang
(74) *Attorney, Agent, or Firm* — Lee & Morse, P.C.

(57) ABSTRACT

Disclosed is a method for manufacturing lithium metal phosphate (LMP) having, as a precursor, crystalline iron phosphate salt having a (meta)strengite structure or metal-doped crystalline iron phosphate salt having a (meta)strengite structure, the method comprising the steps of: mixing a lithium raw material with crystalline iron phosphate salt in a slurry phase or a cake phase; and heat-treating the mixture. The method, by mixing a lithium (Li) raw material and a carbon (C) coating material with crystalline iron phosphate salt in a slurry phase or a cake phase, allows elements such as Li, Fe, P and C to be homogeneously mixed, and then, by having the elements dried simultaneously, enables manufac- (Continued)

turing of high-quality LMP. Therefore, the present invention is not only capable of providing convenience during the manufacturing process for lithium metal phosphate, but also capable of providing a lithium secondary battery positive electrode active material having excellent battery characteristics.

13 Claims, 4 Drawing Sheets

(51) Int. Cl.
      *H01M 10/0525*     (2010.01)
      *H01M 4/36*         (2006.01)
      *H01M 4/587*       (2010.01)
      *H01M 4/04*         (2006.01)
      *H01M 4/62*         (2006.01)

(52) U.S. Cl.
      CPC .......... *H01M 4/0471* (2013.01); *H01M 4/366* (2013.01); *H01M 4/587* (2013.01); *H01M 4/625* (2013.01); *H01M 10/0525* (2013.01)

(58) Field of Classification Search
      USPC ....................................................... 252/500
      See application file for complete search history.

(56) References Cited

U.S. PATENT DOCUMENTS

| | | |
|---|---|---|
| 2009/0220858 A1 | 9/2009 | Cheng et al. |
| 2011/0068295 A1* | 3/2011 | Beck .................. C01B 25/375 252/182.1 |
| 2012/0237425 A1* | 9/2012 | Nishio ................ H01M 4/5825 423/306 |

FOREIGN PATENT DOCUMENTS

| | | |
|---|---|---|
| EP | 2 476 647 A1 | 7/2012 |
| KR | 10-2011-0117619 A | 10/2011 |
| KR | 10-2012-0038843 A | 4/2012 |
| KR | 10-2013-0069022 A | 6/2013 |
| KR | 10-2013-0074806 A | 7/2013 |

OTHER PUBLICATIONS

Souleiman, Manhal et al.; "Study of Ga3+-Induced Hydrothermal Crystallization of an a-Quartz Type Ga1-xFexPO4 Single Crystal by in Situ X-ray Absorption Spectroscopy (XAS)"; Inorganic Chemistry; Oct. 11, 2012; vol. 51, No. 21, pp. 11811-11819 (9 pages).
Masquelier, et al: "Hydrated Iron Phosphates $FePO_4nH_2O$ and $Fe_4(P_2O_7)_3 \cdot nH_2O$ as 3 V Positive Electrodes in Rechargeable Lithium Batteries", Journal of the Electrochemical Society, vol. 149, No. 8, Jan. 1, 2002, p. A1037, XP055122510.
Reale, et al: "Synthesis and Thermal Behavior of Hydrated Iron(III) Phosphates of Interest as Positive Electrodes in Li Batteries", Chemistry of Materials, American Chemical Society, US, vol. 15, No. 26, Dec. 4, 2003, pp. 5051-5058, XP002523335.
XP-002763122 WPI Thomson.
Chinese Office Action dated Oct. 10, 2016 in Corresponding Chinese Patent Application No. 201480012013.9.
Extended European Search Report dated Nov. 4, 2016 in Corresponding European Patent Application No. 14810385.6.

* cited by examiner

METHOD FOR MANUFACTURING LITHIUM METAL PHOSPHATE

TECHNICAL FIELD

The present invention relates to a method for manufacturing lithium metal phosphate, and more particularly, to a method which, in order to manufacture olivine structure lithium metal phosphate (LiMFePO$_4$, hereinafter, referred to as LMP) used as a positive electrode active material for a lithium secondary battery, by mixing a lithium (Li) raw material and a carbon (C) coating material with, as a precursor, crystalline iron phosphate salt (FePO$_4$, hereinafter, referred to as FP) having a (meta)strengite structure or metal-doped crystalline iron phosphate salt (MFePO$_4$, hereinafter, referred to as MFP) having a (meta)strengite structure in a slurry phase or a cake phase to have elements Li, Fe, P and C to be dried simultaneously, allows the elements to be homogeneously mixed, and as a result, enables synthesizing of high-quality LMP.

BACKGROUND ART

In general, olivine structure lithium metal phosphate (LMP) used as a positive electrode active material for a lithium secondary battery is being manufactured by the following two methods.

A first method is to manufacture lithium metal phosphate by using a divalent iron raw material. However, the divalent iron has a problem in that the divalent iron is less stable than trivalent iron, more expensive than a trivalent iron raw material, and easily oxidized, and thus, it is difficult to manage the raw material, and also has a problem in that the specific weight of a volatile material of respective raw materials is high so that the specific weight of lithium metal phosphate synthesized after calcination is low, thereby making battery characteristics deteriorate.

A second method is to manufacture lithium metal phosphate by using amorphous iron phosphate salt hydrate (Amorphous FePO$_4$.2H$_2$O) or amorphous iron phosphate salt anhydride (Amorphous FePO$_4$) as a precursor. However, these methods use, as a precursor, an amorphous iron phosphate salt in which iron and phosphate salt atoms are randomly mixed, and thus, have a problem in that it is required to maintain high temperature during the calcination, and the growth of particles and an increase in process costs are incurred during the high temperature synthesis process.

Thus, as a new synthesis method which may solve the aforementioned problems, the present inventors disclosed in the following previous patents that when lithium transition metal phosphate is synthesized by using, as a precursor, crystalline iron phosphate salt (FP) having a (meta)strengite structure or metal-doped crystalline iron phosphate salt (MFP) having a (meta)strengite structure, due to the structural similarity of precursors and products, high-crystalline lithium metal phosphate may be synthesized at a temperature which is much lower than a temperature at which the amorphous iron phosphate salt hydrate is used as a precursor, and the growth of particles may be controlled at a low calcination temperature, thereby reducing process costs.
  1. Korean Patent Application No. 10-2011-0136537
  2. Korean Patent Application No. 10-2011-0136536

However, the two patents suggest a method for manufacturing LMP by synthesizing and drying crystalline iron phosphate salt ((M)FP), and then solid-phase or wet mixing the crystalline iron phosphate salt ((M)FP) with a lithium source and a carbon source, and then drying the mixture. In this case, primary particles of the (M)FP are nanoparticles having a size of 100 nm or less, and form a strong aggregate during the drying step. Therefore, since it is required to perform a process of disentangling aggregation of the (M)FP during the mixing of the (M)FP with the lithium source and the carbon source in order to synthesize LFP, or the aggregate may hinder materials from being homogeneously mixed, efforts to enhance the efficiency in the process of manufacturing lithium metal phosphate have been continuously made.

DISCLOSURE

Technical Problem

The present invention has been made in an effort to provide a method for synthesizing olivine structure lithium metal phosphate (LMP) from crystalline iron phosphate salt ((M)FP) in an easy and simple way. Further, the present invention is intended to provide LMP which does not deteriorate even in terms of battery characteristics even though the LMP is manufactured by the aforementioned method which is advantageous in the process.

Technical Solution

An exemplary embodiment of the present invention provides a method for manufacturing lithium metal phosphate (LMP) having the following Formula I, the method including: mixing a lithium raw material with a crystalline iron phosphate salt in a slurry phase or a cake phase to form a mixture; and heat-treating the mixture:

$$\text{LiM}_{1-n}\text{Fe}_n\text{PO}_4 \qquad \text{Formula I}$$

Here, M is selected from the group consisting of Ni, Co, Mn, Cr, Zr, Nb, Cu, V, Ti, Zn, Al, Ga and Mg, and 0<n≤1.

Preferably, the step of heat-treating is performed in the range of 500 to 1,000° C.

Preferably, the crystalline iron phosphate salt has a (meta) strengite structure.

Preferably, the crystalline iron phosphate salt is obtained by doping metal (M) during the process of crystallizing an amorphous iron phosphate salt, and may be expressed as the following Formula II:

$$\text{M}_{1-x}\text{Fe}_x\text{PO}_4 \qquad \text{Formula II}$$

Here, M is selected from the group consisting of Ni, Co, Mn, Cr, Zr, Nb, Cu, V, Ti, Zn, Al, Ga and Mg, and 0<x<1.

Preferably, the method may further include a step of drying the mixture after the step of mixing.

Preferably, the crystalline iron phosphate salt in a cake phase is obtained through a washing process after crystallization of an amorphous iron phosphate salt is completed.

Preferably, the lithium raw material may be selected from the group consisting of LiOH, Li$_2$CO$_3$ and LiCl.

Preferably, in the step of mixing the lithium raw material with the crystalline iron phosphate salt, the molar ratio between the crystalline iron phosphate salt and the lithium raw material is in the range from 1:0.5 to 1:1.5.

Preferably, the step of mixing the lithium raw material with the iron phosphate salt further includes mixing a carbon coating material.

Preferably, the carbon coating material may be selected from the group consisting of sucrose, glucose, fructose, xylose, sorbose, polyethylene, ethylene oxide, ascorbic acid, oleic acid, citric acid, PEG6000s, polyvinyl alcohol (PVA), polyvinylpyrrolidone (PVP), polysolvate 80 (Tween 80), Triton X-100, LupasolPN50, and hydroxypropyl methylcellulose (HPMC).

Preferably, the (meta)strengite structure includes one or more selected from the group consisting of crystal with a structure of strengite, crystal with a structure of metastrengite 1 and crystal with a structure of metastrengite 2.

Another exemplary embodiment of the present invention provides a lithium metal phosphate (LMP) manufactured by the method.

Yet another exemplary embodiment of the present invention provides a lithium secondary battery including the lithium metal phosphate (LMP) as a positive electrode active material.

Advantageous Effects

According to the present invention, when crystalline iron phosphate salt having a (meta)strengite structure or metal-doped crystalline iron phosphate salt having a (meta)strengite structure is used as a precursor in order to manufacture lithium metal phosphate (LMP), the lithium metal phosphate is advantageous in that the process is an easy and simple method, and furthermore, process costs may be reduced.

Further, the resulting lithium metal phosphate manufactured by the method of the present invention when used as a positive electrode active material for a lithium secondary battery brings an effect which is similar to lithium metal phosphate manufactured by the existing method in terms of battery characteristics, or rather improves characteristics. Therefore, the present invention is not only capable of providing convenience during the processes for lithium metal phosphate, but also capable of providing a positive electrode active material for a lithium secondary battery having excellent battery characteristics.

BEST MODE

The present invention relates to a method for manufacturing lithium metal phosphate having, as a precursor, crystalline iron phosphate salt or metal-doped crystalline iron phosphate salt, and provides a method for manufacturing olivine structure lithium metal phosphate (LiMFePO$_4$, LMP) having the following Formula I, the method including the steps of: mixing a lithium raw material with crystalline iron phosphate salt in a slurry phase or a cake phase; and heat-treating the mixture.

$$LiM_{1-n}Fe_nPO_4 \quad \text{Formula I}$$

Here, M is selected from the group consisting of Ni, Co, Mn, Cr, Zr, Nb, Cu, V, Ti, Zn, Al, Ga and Mg, and $0<n\leq1$.

Since the crystalline iron phosphate salt (FP) has a (meta)strengite structure in which the octahedral and tetrahedral structures are corner-shared, and since the structure is similar to an olivine structure of lithium iron phosphate, that is, a structure in which the octahedral and tetrahedral structures are line-shared, the synthesis may be conducted under milder conditions when lithium iron phosphate is synthesized by using amorphous iron phosphate salt.

The crystalline iron phosphate salt (FP) may be synthesized through reflux or heat treatment by using iron and phosphate salt as reactants, and is crystallized by heating under a strong acid, particularly during the process of manufacturing the crystalline iron phosphate salt of the present invention. In this case, a (meta)strengite structure may be obtained by adjusting the pH. For example, a crystal of strengite may be obtained in a pH range of 3 to 4, crystal with a structure of metastrengite 1 may be obtained in a pH range of 1 to 2, and crystal with a structure of metastrengite 2 may be obtained in a pH range of 0 to 1. Further, these crystals may also be obtained in a mixed form. The strong acid such as phosphoric acid or hydrochloric acid is added, and the resulting reactant is heated while being stirred at a temperature in a range of 80 to 100° C. for 1 to 6 hours. The termination of the reaction, that is, crystallization may be judged from a time point when the color of the reactant becomes bright.

The reactant is allowed to be mixed with the lithium raw material in a state where crystallization is thus achieved. In this case, the crystalline iron phosphate salt is mixed in a state of not being dried. That is, as described above, the present invention provides a method for manufacturing lithium metal phosphate by directly mixing a lithium raw material with the reactant which is not processed by the drying step after the crystallization has been completed during the process of synthesizing crystalline iron phosphate salt. The reason why the resulting product is not subjected to the drying step is that aggregation of particles occurs during the drying process, and thus, it is required to perform an additional process of grinding the aggregates again for subsequent mixing with the lithium raw material, or elements may not be homogeneously mixed if the reactant is mixed with the lithium raw material in a state where grinding is not sufficiently performed. Accordingly, in the present invention, through a process of mixing a lithium raw material with crystalline iron phosphate salt which is not dried after crystallization has been completed, elements such as iron (Fe), phosphorus (P), and lithium (Li) are allowed to be homogeneously mixed, and simultaneously dried after the homogeneous mixing has been completed.

As an exemplary embodiment of the method for mixing the lithium raw material with crystalline iron phosphate salt, the present invention provides a method for introducing a lithium raw material into iron phosphate salt in a slurry phase, and then mixing the lithium raw material and the iron phosphate by stirring. The lithium raw material may be a powder phase or a slurry phase. In this case, an exact water content is found by collecting a portion of the iron phosphate in a slurry phase, and based on this, the lithium raw material is metered and introduced so that the molar ratio between iron phosphate salt and lithium element is in the range from 1:0.5 to 1:1.5. The stirring may be performed by magnetic stirrers or simply hand-shaking for 30 minutes to 1 hour. The lithium raw material may be selected from the group consisting of LiOH, Li$_2$CO$_3$ and LiCl, but is not limited thereto.

Next, it is preferred that the mixture is washed two to five times by using a decompression filter or a centrifuge after the stirring, and then, the drying process is performed. As an exemplary embodiment, the drying may be performed in an oven in a temperature range of 90 to 100° C. And then, a final lithium metal phosphate (LMP) is obtained by heat-treating the mixture at a temperature in a range of 500 to 1,000° C. In this case, it is preferred that the heat treatment is performed under a 1 to 5% $H_2/N_2$ mixed gas atmosphere for 4 to 12 hours.

Meanwhile, as another exemplary embodiment of the method for mixing a lithium raw material with crystalline iron phosphate salt, the present invention provides a method for mixing a lithium raw material with iron phosphate salt in a cake phase. In order to obtain iron phosphate salt in the cake phase, the reaction slurry is washed two to five times by using a centrifuge at the time point when the color of the reactant becomes bright. This is a process for obtaining the cake phase from the slurry, crystallization of which has been completed. After washing, the supernatant is decanted out, and the cake phase precipitated at the bottom is obtained. An exact moisture content is found by collecting a portion of the thus obtained cake phase, and based on this, mixing is achieved by metering and introducing the lithium raw material in a powder phase so that the molar ratio between iron phosphate salt and lithium element is in the range from 1:0.5 to 1:1.5. The mixing is performed by using a mortar and the like, and the amount of moisture is not so large that natural drying occurs while moisture is evaporated during the mixing process. Accordingly, a separate drying process as in the case of the slurry phase may not be needed in the process. And then, a final lithium metal phosphate (LMP) is obtained by heat-treating the dried mixture under a 1 to 5% $H_2/N_2$ mixed gas atmosphere at a temperature in a range of 500 to 1,000° C. for 4 to 12 hours.

Meanwhile, the crystalline iron phosphate salt (FP) may be metal-doped crystalline iron phosphate salt which is doped with heterogeneous metals and may be expressed as the following Formula II:

$$M_{1-x}Fe_xPO_4 \quad \text{Formula II}$$

Here, M is selected from the group consisting of Ni, Co, Mn, Cr, Zr, Nb, Cu, V, Ti, Zn, Al, Ga and Mg, and 0<x<1.

The metal-doped crystalline iron phosphate salt is obtained by doping heterogeneous metals when amorphous iron phosphate salt is crystallized during the process of manufacturing crystalline iron phosphate salt. That is, crystalline iron phosphate salt is manufactured by mixing heterogeneous metal salts in the crystallization process, and then crystallizing the mixture including the heterogeneous metal salts.

The manufacture of metal-doped crystalline iron phosphate salt is not limited thereto, but as an exemplary embodiment in the present invention, metal-doped crystalline iron phosphate salt is manufactured by mixing $FeCl_3$ and $(NH_4)_2HPO_4$ or $NH_4H_2PO_4$ as raw materials in a liquid phase state, and then reacting the raw materials. In this case, the molar ratio between [Fe] and [P] may be in the range of 1:0.9 to 1:1.1, and the volume fraction of the solid in the solvent is preferably 5 to 15%. In this case, it is preferred that the pH of the reactant is adjusted to 4 to 7, and the raw materials may be reacted with each other by stirring at a temperature of 25 to 70° C. for 10 to 30 minutes. It is preferred that the mixture after the stirring is washed two to five times by using a decompression filter or a centrifuge, and then, the resulting mixture is dried. And then, in order to induce doping of heterogeneous metals, metal is added in the form of a salt having an $MX_3$ (here, M is selected from the group consisting of Ni, Co, Mn, Cr, Zr, Nb, Cu, V, Ti, Zn, Al, Ga and Mg, and X is an anion including halogen) structure, and the mixture is mixed. In this case, the molar ratio between [Fe] and [M] is allowed to be 1-x:x (0<x<1). Furthermore, the mixing with a heterogeneous metal salt aqueous solution in the form of slurry may be homogeneously achieved in a liquid phase. Finally, in the step of crystallizing the mixture, the mixture is crystallized by heating under a strong acid. Metal-doped crystalline iron phosphate salt may be obtained as a (meta)strengite structure by adjusting the pH as in the crystalline iron phosphate salt. For example, strengite crystal may be obtained in a pH range of 3 to 4, crystal with a structure of metastrengite 1 may be obtained in a pH range of 1 to 2, and crystal with a structure of metastrengite 2 may be obtained in a pH range of 0 to 1. Further, these crystals may also be obtained in a mixed form. Here, the strong acid such as phosphoric acid or hydrochloric acid is added, and the resulting reactant is heated while being stirred at a temperature of 90 to 100° C. for 1 to 6 hours. The termination of the reaction, that is, crystallization may be judged from a time point when the color of the reactant becomes bright.

Subsequently, a process of obtaining a final lithium metal phosphate (LMP) through the process of mixing with the lithium raw material, drying the mixture, and heat-treating the mixture is the same as described above with regard to crystalline iron phosphate salt. In order to be distinguished from lithium metal phosphate manufactured from such a metal-doped crystalline iron phosphate salt, particularly, a lithium metal phosphate manufactured from crystalline iron phosphate salt, which is not metal-doped, is more specifically also referred to as "a lithium iron phosphate (LFP)".

Meanwhile, in the process in which a lithium raw material is mixed with crystalline iron phosphate salt or metal-doped crystalline iron phosphate salt, as the carbon coating material, sucrose, glucose, fructose, xylose, sorbose, polyethylene, ethylene oxide, ascorbic acid, oleic acid, citric acid, PEG6000s, polyvinyl alcohol (PVA), polyvinylpyrrolidone (PVP), polysolvate 80 (Tween 80), Triton X-100, LupasolPN50, or hydroxypropyl methylcellulose (HPMC) may be included, but the carbon coating material is not limited thereto. In this case, the carbon coating material may be included in an amount of 20 to 40% based on the weight of lithium (Li) element. The carbon coating material may be included in the process of mixing the lithium raw material with the crystalline iron phosphate salt, which is not subjected to drying step, and as a result, elements such as iron (Fe), phosphorus (P), lithium (Li), and carbon (C) may be homogeneously mixed, and the elements are simultaneously dried in the subsequent drying process.

Hereinafter, the present invention will be described in more detail with reference to the Examples, but the present invention is not limited to the following Examples.

EXAMPLE 1

(1) Synthesis of Amorphous Iron Phosphate Salt Hydrate (Amorphous $FePO_4 \cdot 2H_2O$)

A slurry was formed by taking $FeCl_3 \cdot 6H_2O$ and $(NH_4)_2HPO_4$ so that the molar ratio between [Fe] and [P] is 1:1, putting the two compounds into pure water, and mixing the mixture. In this case, the volume fraction of the solid in the solvent was 10%. Subsequently, the pH was adjusted to 4.5 by adding ammonia water ($NH_4OH$) to the mixed slurry. Next, the slurry with the pH adjusted was stirred at 60° C. for 15 minutes. Then, amorphous iron phosphate salt hydrate in the cake phase was obtained by washing the reaction slurry three times using a centrifuge.

(2) Synthesis of Crystalline Iron Phosphate Salt
Hydrate (Crystalline $FePO_4.2H_2O$) and Synthesis of
LFP Using the Same A slurry was formed by adding pure water to the amorphous iron phosphate salt hydrate cake obtained above. In this case, the volume fraction of the solid content in the solvent was 10%. The pH was adjusted to 2 by adding phosphoric acid ($H_3PO_4$) to the slurry. Next, the slurry with the pH adjusted was stirred at 95° C. for 3 hours. An exact moisture amount was measured by taking a portion of the slurry at a time point when the color of the slurry became bright, and then, based on this, LiOH was added thereto as a lithium raw material so that the molar ratio between [Li] and [Fe] was 1:1, and sucrose was added as the carbon coating material so that sucrose was present in an amount of 30% based on the weight of lithium (Li) element. Next, the resulting product was additionally stirred for 30 minutes, and then, the reaction slurry was washed three times by using a centrifuge, and the washed cake was dried in an oven at 90° C. Lithium iron phosphate (LFP) was finally obtained by heat-treating the dried powder under a 3% $H_2/N_2$ mixed gas atmosphere at a temperature of 650° C. for 10 hours.

EXAMPLE 2

(1) Synthesis of Amorphous Iron Phosphate Salt
Hydrate (Amorphous $FePO_4.2H_2O$)

An amorphous iron phosphate salt hydrate in a cake phase was obtained in the same manner as in Example 1.

(2) Synthesis of Crystalline Iron Phosphate Salt
Hydrate (Crystalline $FePO_4.2H_2O$) and Synthesis of
LFP Using the Same A slurry was formed by adding pure water to the amorphous iron phosphate salt hydrate cake obtained above. In this case, the volume fraction of the solid in the solvent was 10%. The pH was adjusted to 2 by adding phosphoric acid ($H_3PO_4$) to the slurry. Next, the slurry with the pH adjusted was stirred at 95° C. for 3 hours. The reaction was terminated at a time point when the color of the slurry became bright. Next, the reaction slurry was washed three times by using a centrifuge, the moisture amount of washed cake was measured, and based on this, LiOH was added as a lithium raw material so that the molar ratio between [Li] and [Fe] was 1:1, and sucrose was added as a carbon coating material so that sucrose was present in an amount of 30% based on the weight of lithium (Li) element. And then, the resulting mixture was mixed by using a mortar, and the mixture was allowed to be naturally dried. Lithium iron phosphate (LFP) was finally obtained by heat-treating the mixed powder under a 3% $H_2/N_2$ mixed gas atmosphere at a temperature of 650° C. for 10 hours.

EXAMPLE 3

(1) Synthesis of Metal-Doped Crystalline Iron
Phosphate Salt Hydrate (Crystalline
$M_{1-x}Fe_xPO_4.2H_2O$)

An amorphous iron phosphate salt hydrate in a cake phase was obtained in the same manner as in Example 1. A slurry was formed by taking the amorphous iron phosphate salt hydrate obtained above and chromium trichloride ($CrCl_3$) so that the molar ratio between [Fe] and [Cr] was 0.98:0.02, adding pure water thereto, and mixing the mixture. In this case, the volume fraction of the solid in the solvent was 10%. The pH was adjusted to 2 by adding phosphoric acid ($H_3PO_4$) to the slurry. Next, the slurry with the pH adjusted was stirred at 95° C. for 3 hours. The reaction was terminated at a time point when the color of the slurry became bright.

(2) Synthesis of Lithium Metal Phosphate (LMP)

An exact moisture amount was measured by taking a portion of the reaction slurry, and then, based on this, LiOH was added thereto as a lithium raw material so that the molar ratio between [Li] and [Fe] was 1:1, and sucrose was added as the carbon coating material so that sucrose was present in an amount of 30% based on the weight of lithium (Li) element. Next, the mixture was additionally stirred for 30 minutes, and then, the reaction slurry was dried in an oven at 90° C. Lithium metal phosphate (LMP) was finally obtained by heat-treating the dried powder under a 3% $H_2/N_2$ mixed gas atmosphere at a temperature of 650° C. for 10 hours.

EXAMPLE 4

(1) Synthesis of Metal-Doped Crystalline Iron
Phosphate Salt Hydrate (Crystalline
$M_{1-x}Fe_xPO_4.2H_2O$)

A metal-doped crystalline iron phosphate salt hydrate in a cake phase was obtained by terminating the reaction at a time point when the color of the slurry became bright, and then washing the reaction slurry three times using a centrifuge, in the same manner as in Example 3.

(2) Synthesis of Lithium Metal Phosphate (LMP)

A moisture amount of the metal-doped crystalline iron phosphate salt hydrate cake was measured, and based on this, LiOH was added thereto as a lithium raw material so that the molar ratio between [Li] and [Fe] was 1:1, and sucrose was added thereto as a carbon coating material so that sucrose was present in an amount of 30% based on the weight of lithium (Li) element. And then, the mixture was dried while mortar mixing was performed. Lithium metal phosphate (LMP) was finally obtained by heat-treating the mixed powder under a 3% $H_2/N_2$ mixed gas atmosphere at a temperature of 650° C. for 10 hours.

EXAMPLE 5

Lithium iron phosphate (LFP) was obtained in the same manner as in Example 1, except that $Li_2CO_3$ was used instead of LiOH as the lithium raw material.

EXAMPLE 6

Lithium iron phosphate (LFP) was obtained in the same manner as in Example 1, except that glucose was used instead of sucrose as the carbon coating material.

COMPARATIVE EXAMPLE 1

(1) Synthesis of Amorphous Iron Phosphate Salt
Hydrate (Amorphous $FePO_4.2H_2O$)

An amorphous iron phosphate salt hydrate in a cake phase was obtained in the same manner as in Example 1.

(2) Synthesis of Crystalline Iron Phosphate Salt Hydrate (Crystalline $FePO_4 \cdot 2H_2O$)

A slurry was formed by adding pure water to the amorphous iron phosphate salt hydrate cake obtained above. In this case, the volume fraction of the solid in the solvent was 10%. The pH was adjusted to 2 by adding phosphoric acid ($H_3PO_4$) to the slurry. Next, the slurry with the pH adjusted was stirred at 95° C. for 3 hours. The reaction was terminated at a time point when the color of the slurry became bright. Next, the reaction slurry was washed three times by using a centrifuge, and crystalline iron phosphate salt with a structure of metastrengite 1 was synthesized by drying the washed cake in an oven at 90° C.

(3) Synthesis of Lithium Iron Phosphate (LFP)

The crystalline iron phosphate salt with a structure of metastrengite 1, LiOH as the lithium raw material, and sucrose as the carbon coating material were mixed in a mortar. In this case, the crystalline iron phosphate salt and LiOH were mixed so that the molar ratio between [FP] and [Li] was 1:1, and so that the ratio of sucrose was 30% based on the weight of lithium (Li) element. Lithium iron phosphate (LFP) was finally obtained by heat-treating the mixed powder under a 3% $H_2/N_2$ mixed gas atmosphere at a temperature of 650° C. for 10 hours.

COMPARATIVE EXAMPLE 2

$Li_2CO_3$, $FeC_2O_4$, $(NH_4)_2HPO_4$ and sucrose were put into pure water, and ball-milled for 16 hours. $Li_2CO_3$, $FeC_2O_4$, and $(NH_4)_2HPO_4$ were mixed so that the molar ratio of [Li] to [Fe] to [P] was 1:1:1, and sucrose was allowed to be present in an amount of 30% based on the weight of lithium (Li) element. In this case, the volume fraction of the solid in the solvent was 30%. Lithium iron phosphate (LFP) was finally obtained by heat-treating the mixture under a 3% $H_2/N_2$ reducing gas atmosphere at 750° C. for 8 hours.

COMPARATIVE EXAMPLE 3

An amorphous iron phosphate salt hydrate (Amorphous $FePO_4 \cdot 2H_2O$) was mixed with LiOH and sucrose, and the mixture was dry ball-milled for 16 hours.

In this case, the amorphous iron phosphate salt hydrate and LiOH were mixed so that the molar ratio between [FP] and [Li] was 1:1, and sucrose was mixed so as to be present in an amount of 30% based on the weight of lithium (Li) element. Lithium iron phosphate (LFP) was finally obtained by heat-treating the mixture under a 3% $H_2/N_2$ reducing gas atmosphere at 800° C. for 8 hours.

Analysis

An XRD observation result of diffraction patterns of the crystalline iron phosphate (FP) synthesized in Example 1 and lithium iron phosphate (LFP) manufactured from the same and an SEM observation result of the lithium iron phosphates (LFP) manufactured in Examples 1 and 2 are illustrated in FIGS. 1 to 4.

The specifications of XRD and SEM and analysis conditions are as follows.

XRD: Analysis by D/Max-2500VK/PC manufactured by Rikagu Inc.

(Analysis condition: CuKa radiation, speed 4° $min^{-1}$)

SEM: Captured by JSM-7400F manufactured by JEOL Co., Ltd. (Analysis condition: 20 kV)

Figure 1:
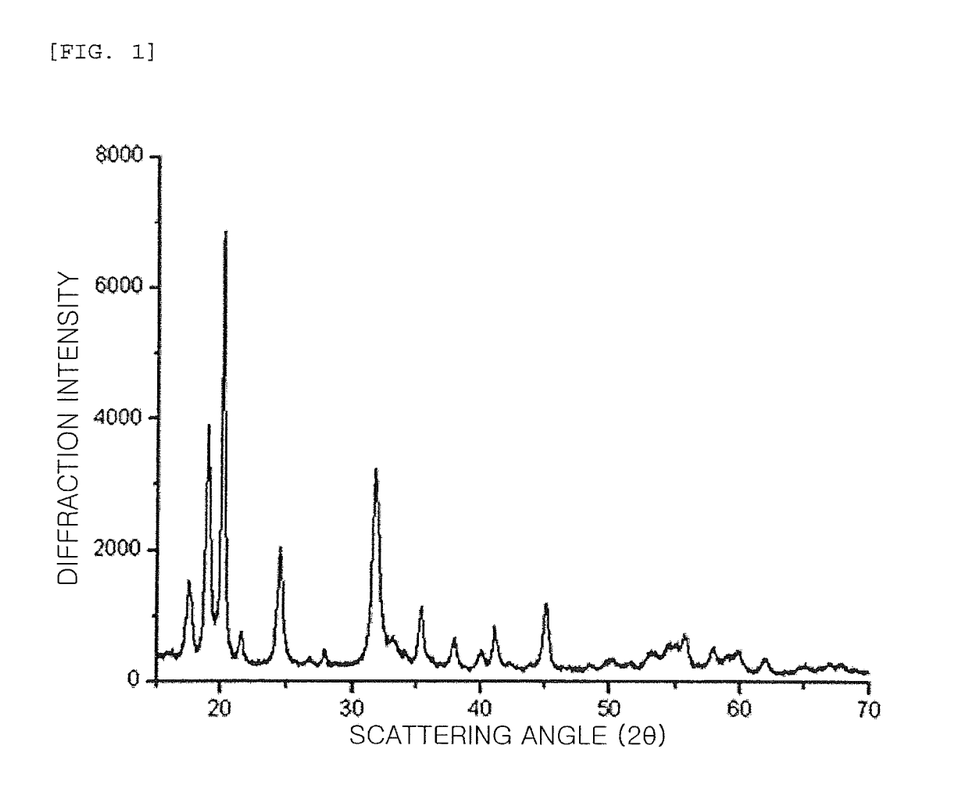
FIG. 1 is a diffraction pattern of crystalline iron phosphate salt (FP) synthesized in Example 1, which is observed by XRD.
Figure 2:
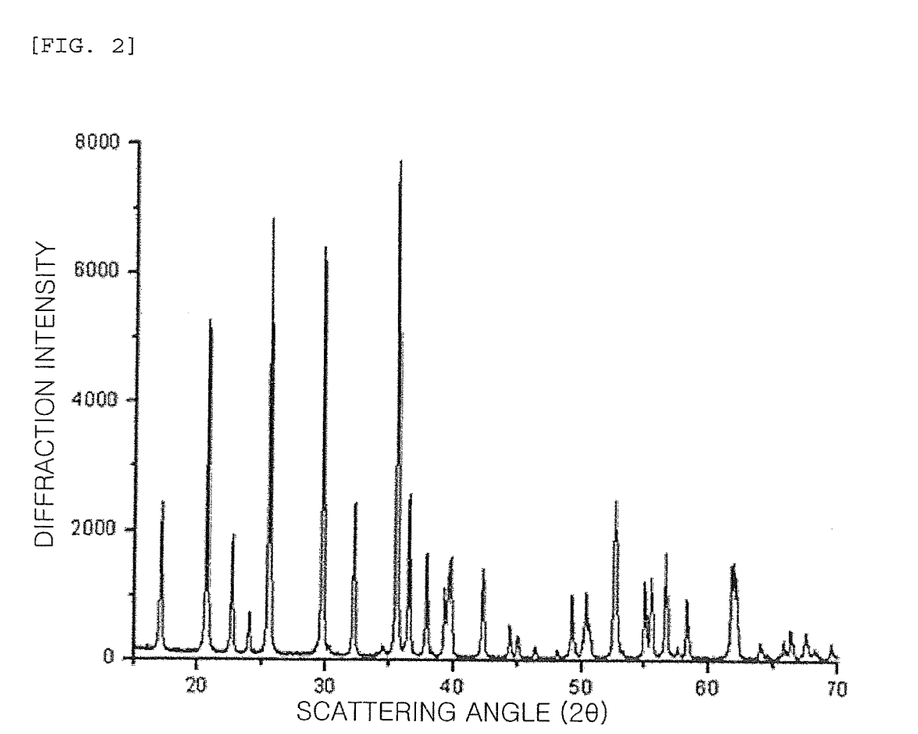
FIG. 2 is a diffraction pattern of lithium iron phosphate (LFP) manufactured in Example 1, which is observed by XRD.
Figure 3:
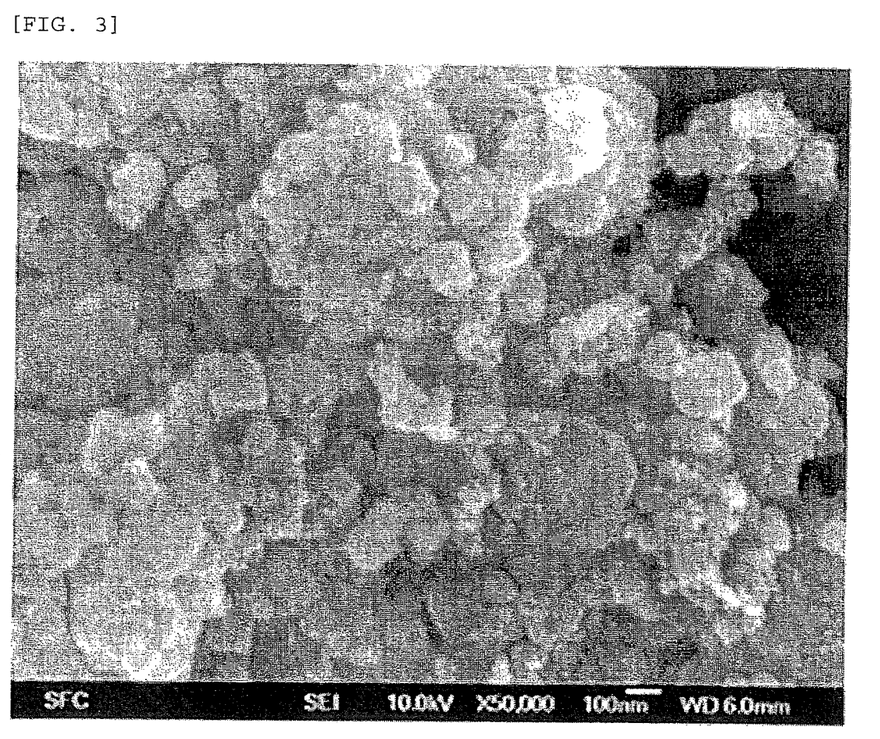
FIG. 3 is an image of lithium iron phosphate (LFP) manufactured in Example 1, which is captured by SEM.
Figure 4:
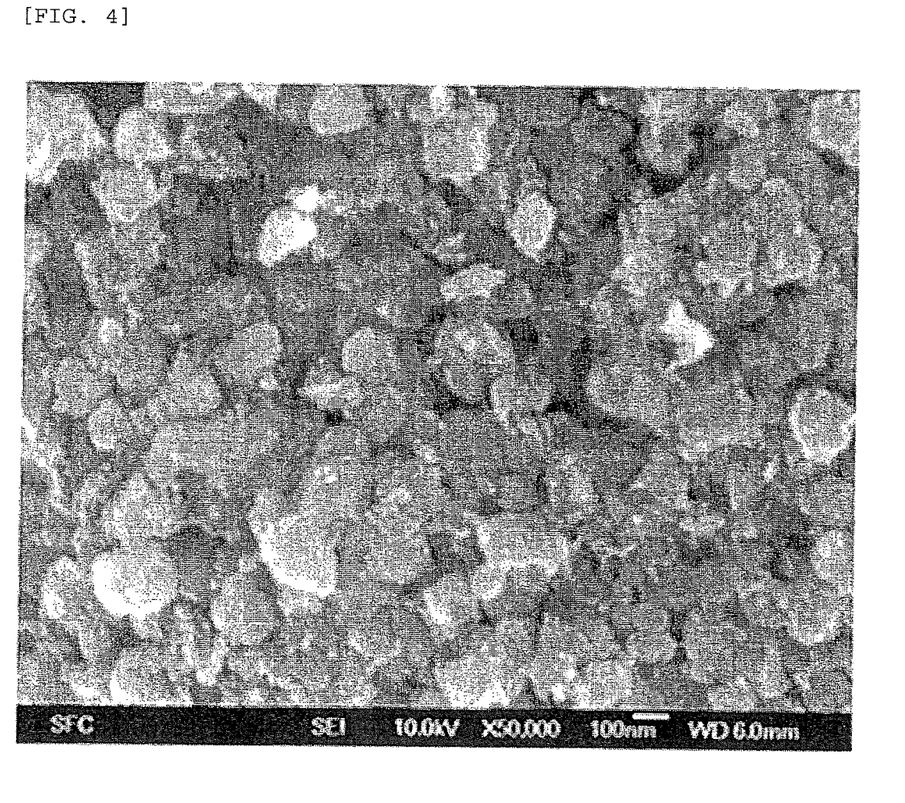
FIG. 4 is an image of lithium iron phosphate (LFP) manufactured in Example 2, which is captured by SEM.

FIG. 1 is an XRD diffraction pattern of the crystalline iron phosphate salt (FP) synthesized in Example 1, confirming that the nanoparticles thereof constitute a structure of crystalline metastrengite 1. FIG. 2 is an XRD diffraction pattern of the lithium iron phosphate salt (LFP) manufactured in Example 1, confirming that the nanoparticles thereof constitute a crystalline olivine structure. FIGS. 3 and 4 are the SEM photographs of the lithium iron phosphate salts (LFP) manufactured in Examples 1 and 2, and it can be seen that particles thereof have a nano size.

Evaluation of Battery Characteristics

Each discharge capacity of the lithium iron phosphates manufactured according to Examples 1 and 2 of the present invention and the lithium iron phosphates manufactured according to Comparative Examples 1, 2, and 3 was evaluated.

A slurry was manufactured by using each of the lithium iron phosphates manufactured in Examples 1 and 2 and the lithium iron phosphates manufactured in Comparative Examples 1 to 3 as a positive electrode active material to set the ratio of the active material: a conductive material (carbon black): a binder (PVdF) to 85:5:10 wt %, adding the positive electrode active material to an NMP (N-methyl pyrrolidone) solvent, and mixing the mixture. Next, an aluminum plate was laid on a glass plate disinfected with alcohol or acetone, and the mixed slurry was uniformly applied to have a thickness of 20 to 25 µm thereon by using a doctor blade. The solvent was removed by drying the slurry in an oven (about 90 to 100° C.) for 8 hours. Next, a thickness of 50 to 70 µm, which is suitable as a positive electrode plate, was created by using a press machine to apply pressure thereon, and a positive electrode plate was prepared by punching the plate so as to meet the coin cell regulations. Next, a negative electrode plate was prepared by binding lithium metal to a pole plate in a glove box filled with an inert gas. A coin cell was prepared by placing the lithium negative electrode plate in the coin cell lower case, putting a separation membrane (manufactured by Celgard LLC, Celgard 2300, thickness: 25 µm), an electrolyte (1.3M LiPF6 in EC/EMC=3/7), a positive electrode plate, and an upper case in this order, and assembling the components. The discharge capacity was evaluated by using a charge/discharge tester (Toyo, T475-HR), and the results are shown in the following Table 1.

TABLE 1

| C-rate | Example 1 | Example 2 | Comparative Example 1 | Comparative Example 2 | Comparative Example 3 |
|---|---|---|---|---|---|
| FM (Initial capacity) | 158.5 mAh/g | 164.0 mAh/g | 162.8 mAh/g | 158.6 mAh/g | 133.7 mAh/g |
| 0.1 C | 159.3 mAh/g | 165.1 mAh/g | 160.6 mAh/g | 158.8 mAh/g | 135.8 mAh/g |
| 0.2 C | 157.7 mAh/g | 163.7 mAh/g | 162.3 mAh/g | 156.8 mAh/g | 129.3 mAh/g |
| 0.2 C | 158.2 mAh/g | 164.2 mAh/g | 162.9 mAh/g | 156.4 mAh/g | 129.6 mAh/g |
| 0.5 C | 152.1 mAh/g | 160.7 mAh/g | 158.5 mAh/g | 151.5 mAh/g | 117.6 mAh/g |
| 0.5 C | 152.1 mAh/g | 160.8 mAh/g | 158.7 mAh/g | 150.7 mAh/g | 117.5 mAh/g |

TABLE 1-continued

| C-rate | Example 1 | Example 2 | Comparative Example 1 | Comparative Example 2 | Comparative Example 3 |
|---|---|---|---|---|---|
| 1 C | 149.6 mAh/g | 157.9 mAh/g | 156.1 mAh/g | 147.6 mAh/g | 108.2 mAh/g |
| 1 C | 150.0 mAh/g | 158.2 mAh/g | 156.4 mAh/g | 146.9 mAh/g | 108.3 mAh/g |
| 2 C | 144.9 mAh/g | 154.0 mAh/g | 151.8 mAh/g | 142.3 mAh/g | 96.7 mAh/g |
| 3 C | 140.7 mAh/g | 150.7 mAh/g | 148.0 mAh/g | 137.8 mAh/g | 88.7 mAh/g |
| 5 C | 129.0 mAh/g | 143.2 mAh/g | 139.0 mAh/g | 129.8 mAh/g | 77.0 mAh/g |
| 7 C | 113.3 mAh/g | 134.4 mAh/g | 128.0 mAh/g | 120.5 mAh/g | 67.0 mAh/g |

As shown in Table 1, battery characteristics of a lithium iron phosphate (Example 2) manufactured by using crystalline iron phosphate salt in the cake phase were the best among all the samples. That is, the discharge capacity during the high speed operation (7C) with respect to the initial capacity was 0.82%, which exhibited the best result among the five samples evaluated. Next, when compared to 0.79% in the case of the lithium iron phosphate (Comparative Example 1) manufactured by using crystalline iron phosphate salt and 0.76% in the case of the lithium iron phosphate (Comparative Example 2) manufactured by using a divalent iron raw material, the discharge capacity of the lithium iron phosphate (Example 1) manufactured by using crystalline iron phosphate salt in the cake phase 0.71%, and deterioration in characteristics was not very severe. In contrast, the discharge capacity of the lithium iron phosphate (Comparative Example 3) manufactured by using iron phosphate salt was 0.50%, and deterioration in characteristics was severe. From the results, it can be confirmed that the present invention brings about effects in that processes are convenient and battery characteristics are not significantly degraded, or are rather improved.

The invention claimed is:

1. A method for manufacturing lithium metal phosphate having the following Formula I, the method comprising:
providing a crystalline iron phosphate salt in a slurry phase or a cake phase;
mixing a lithium raw material with the provided crystalline iron phosphate salt in the slurry phase or the cake phase to form a mixture, wherein the provided crystalline iron phosphate salt in the slurry phase or the cake phase is in a state of not having been subjected to a drying process; and
heat-treating the mixture:

$$LiM_{1-n}Fe_nPO_4, \quad \text{Formula I}$$

where M is selected from Ni, Co, Mn, Cr, Zr, Nb, Cu, V, Ti, Zn, Al, Ga and Mg, and $0<n\leq 1$.

2. The method of claim 1, wherein heat-treating the mixture is performed in the range of 500 to 1,000° C.

3. The method of claim 1, wherein the crystalline iron phosphate salt has a (meta)strengite structure.

4. The method of claim 1, wherein the crystalline iron phosphate salt is a doped crystalline iron phosphate salt obtained by doping a metal (M) during a process of crystallizing an amorphous iron phosphate salt, the doped crystalline iron phosphate salt being expressed as the following Formula II:

$$M_{1-x}Fe_xPO_4, \quad \text{Formula II}$$

where M is selected from Ni, Co, Mn, Cr, Zr, Nb, Cu, V, Ti, Zn, Al, Ga and Mg, and $0<x<1$.

5. The method of claim 1, further comprising drying the mixture after the mixing.

6. The method of claim 1, wherein the crystalline iron phosphate is in the cake phase, and the crystalline iron phosphate salt in the cake phase is obtained by washing the crystalline iron phosphate salt after crystallization of an amorphous iron phosphate salt to form the crystalline iron phosphate salt is completed.

7. The method of claim 1, wherein the lithium raw material is selected from LiOH, $Li_2CO_3$ and LiCl.

8. The method of claim 1, wherein in mixing the lithium raw material with the crystalline iron phosphate salt, the molar ratio between the crystalline iron phosphate salt and the lithium raw material is in the range from 1:0.5 to 1:1.5.

9. The method of claim 1, wherein mixing the lithium raw material with the crystalline iron phosphate salt further includes mixing a carbon coating material with the lithium raw material and the crystalline iron phosphate salt.

10. The method of claim 9, wherein the carbon coating material is selected from sucrose, glucose, fructose, xylose, sorbose, polyethylene, ethylene oxide, ascorbic acid, oleic acid, citric acid, PEG6000s, polyvinyl alcohol (PVA), polyvinylpyrrolidone (PVP), polysolvate 80 (Tween 80), Triton X-100, LupasolPN50, and hydroxypropyl methylcellulose (HPMC).

11. The method of claim 3, wherein the (meta)strengite structure includes one or more selected from a crystal with a structure of strengite, a crystal with a structure of metastrengite 1 and a crystal with a structure of metastrengite 2.

12. A lithium metal phosphate (LMP) manufactured by the method of claim 1.

13. A lithium secondary battery comprising the lithium metal phosphate (LMP) of claim 12 as a positive electrode active material.

* * * * *